United States Patent
Vogel et al.

(10) Patent No.: US 10,459,949 B2
(45) Date of Patent: Oct. 29, 2019

(54) SYSTEM AND METHOD FOR BUILDING, VERIFYING AND MAINTAINING AN ONTOLOGY

(71) Applicant: Oscaro, Paris (FR)

(72) Inventors: Claude Vogel, Key West, FL (US); Nils Grunwald, Paris (FR); Pierre-Noel Luiggi, Paris (FR)

(73) Assignee: OSCARO, Paris (FR)

( * ) Notice: Subject to any disclaimer, the term of this patent is extended or adjusted under 35 U.S.C. 154(b) by 849 days.

(21) Appl. No.: 14/980,796

(22) Filed: Dec. 28, 2015

(65) Prior Publication Data
US 2016/0188698 A1    Jun. 30, 2016

Related U.S. Application Data

(60) Provisional application No. 62/098,152, filed on Dec. 30, 2014.

(51) Int. Cl.
| G06F 17/30 | (2006.01) |
| G06F 16/28 | (2019.01) |
| G06Q 10/08 | (2012.01) |
| G06F 16/2457 | (2019.01) |
| G06N 5/02 | (2006.01) |

(52) U.S. Cl.
CPC ...... G06F 16/285 (2019.01); G06F 16/24573 (2019.01); G06F 16/24575 (2019.01); G06N 5/022 (2013.01); G06Q 10/087 (2013.01)

(58) Field of Classification Search
CPC ............................................. G06F 17/30734
USPC ......................................................... 707/740
See application file for complete search history.

(56) References Cited

U.S. PATENT DOCUMENTS

| 2003/0055812 A1* | 3/2003 | Williams .......... G06F 17/30994 |
| 2007/0119250 A1 | 10/2007 | Hardarson |
| 2013/0041786 A1 | 2/2013 | Adegan |
| 2013/0091139 A1* | 4/2013 | Rajpathak ........... G06F 17/2785 707/740 |
| 2014/0074865 A1 | 3/2014 | Zobrist |
| 2016/0078403 A1 | 3/2016 | Sethi |

OTHER PUBLICATIONS

Natalya, F. Noy et al., "The PROMPT suite: interactive tools for ontology merging and mapping," International Journal of Human-Computer Studies, vol. 59, No. 6, Dec. 2003 pp. 983-1024.

* cited by examiner

*Primary Examiner* — Baoquoc N To
(74) *Attorney, Agent, or Firm* — DLA Piper LLP (US)

(57) ABSTRACT

A system and method for building, maintaining and verifying an ontology are disclosed. The ontology may be build based on a meronymy and a taxonomy. In one example, the generated ontology may be an automotive mechanical systems ontology and the meronymy is a vehicle systems meronymy and the taxonomy is a universal parts taxonomy. The system may utilize consistent lexical derivation of the elements in the generated taxonomy.

27 Claims, 28 Drawing Sheets e.g. "Engine Intake Manifold Vent Pipe"
Engine
- Engine Intake
  - Engine Intake Manifold
    » Engine Intake Manifold Vent
      - Engine Intake Manifold Vent Pipe

FIGURE 5

Mechanical system
    Engine Oil System
        ATL::Universal Part
        ATL::Filters
            ATL::Universal Part
            ATL::Assembly
                ATL::Universal Part
                ATL::Hardware Kits

FIGURE 6

```
    "agregat hydraulique & système de freinage": {
        "label": {
            "fr": {
                "preferred": "Agregat hydraulique & système de
freinage"
            }
        },
        "language": "fr",
        "status": "preferred",
        "syn_of": [
            "abs hydraulic"
        ],
        "tags": [
            "fr",
            "OPID415",
            "SYN"
        ]
    },
```

FIGURE 11

```
"abs hydraulic": {
    "atl_of": [
        "assembly",
        "hoses",
        "repair kit",
        "valves"
    ],
    "has_syn": [
        "abs hydraulic block",
        "abs hydraulic unit",
        "bloc hydraulique abs",
        "agregat hydraulique & système de freinage"
    ],
    "has_tax": [
        "abs hydraulic control unit",
        "abs pressure regulator",
        "abs pump and motor"
    ],
    "label": {
        "en": {
            "preferred": "ABS Hydraulic"
        },
        "fr": {
            "preferred": "Agregat hydraulique & système de freinage"
        }
    },
    "language": "en",
    "tags": [
        "en"
    ],
    "tax_of": [
        "abs"
    ]
},
```

FIGURE 12

```
"abs hydraulic": {
    "id": [
        {
            "level": "pid",
            "standard": "tecdoc",
            "value": "415"
        }
    ],
    "label": {
        "en": "ABS Hydraulic",
        "fr": "Agregat hydraulique & système de freinage"
    },
    "parent": "abs"
},
```

FIGURE 13

```
ASID122::Brake Hydraulics
    SYN:fr::Hydraulique De Frein
    SYN:OSID70?862:fr::Hydraulique
    ATL::Assembly
    ATL::Hose
    ATL::Seals
    Brake Hydraulic Pump
        ATL::Valve
    APID1820::Brake Hydraulic Line(...)
    APID1836::Brake Master Cylinder
        SYN:fr::Maitre-Cylindre De Frein
        SYN:OSID1118:fr::Pompe hydraulique à système de freinage
        SYN:OSID253:fr::Maître-cylindre de frein
        ATL::Assembly
        ATL::B&S
        ATL::Cover
        ATL::Repair kit
        ATL::Seals
        ATL::Sensors
        APID16144::Brake Master Cylinder Access Plate
        APID20813::Brake Master Cylinder Adapter
        APID20765::Brake Master Cylinder Diaphragm
        APID20766::Brake Master Cylinder Line(...)
        APID20768::Brake Master Cylinder Piston
        APID11810::Brake Master Cylinder Plug
        APID18261::Brake Master Cylinder Reservoir(...)
    Brake Pressure Accumulator
```

FIGURE 14

```
pruning tree...
 pruning brake :
      checking standard for brake :
            checking standard for brake conversion kit :
            brake conversion kit not checked
            checking standard for abs :
                  checking standard for abs accumulator :
                  abs accumulator not checked
                  checking standard for abs actuator :
                  abs actuator not checked
                  checking standard for abs control :
                        checking standard for abs control module :
                            synonym appareil de commande à
système de freinage : ['OPID1219', 'fr', 'SYN'] belongs to ['tecdoc']
                            header abs control module belongs to
['tecdoc']
                            abs control module copied to temp
                            hypo abs control module belongs to ['tecdoc']
                        hypo abs control belongs to ['tecdoc']
                  abs control copied to temp
                  hypo abs belongs to ['tecdoc']
            abs copied to temp
     brake copied to temp
      pruning brake conversion kit :

etc.
```

FIGURE 15

```
"abs hydraulic": {
    "id": [
        {
            "level": "pid",
            "standard": "tecdoc",
            "value": "415"
        }
    ],
    "label": {
        "en": "ABS Hydraulic",
        "fr": "Agregat hydraulique & système de freinage"
    },
    "parent": "abs"
},
```

FIGURE 16

```
"brake master cylinder": {
    "id": [
        {
            "level": "pid",
            "standard": "aaia",
            "value": "1836"
        },
        {
            "level": "pid",
            "standard": "tecdoc",
            "value": "1115"
        },
        {
            "level": "pid",
            "standard": "tecdoc",
            "value": "258"
        }
    ],
    "label": {
        "en": "Brake Master Cylinder",
        "fr": "Maître-cylindre de frein"
    },
    "parent": "brake hydraulics"
},
```

FIGURE 17 hydraulic brake booster moved up 1 level, now attached to: power brake booster
power brake booster vacuum pump valve operating rod moved up 1 level, now attached to: power brake booster
brake master cylinder reservoir strainer moved up 1 level, now attached to: brake master cylinder
power brake booster vacuum pump diaphragm moved up 1 level, now attached to: power brake booster

FIGURE 18

```
Export:
 brake
        drum brakes
                drum brake wheel cylinder
        brake hydraulics
                brake master cylinder
                        brake master cylinder reservoir strainer
                        brake master cylinder reservoir
        disc brakes
                disc brake caliper
                disc brake rotor
                disc brake pad
        abs
                abs control
                        abs control module
                        abs relay
                abs hydraulic
                        abs hydraulic control unit
        brake power assistance
                power brake booster
                        hydraulic brake booster
                        power brake booster vacuum pump valve operating rod
                        power brake booster vacuum pump
                        power brake booster vacuum pump diaphragm
                        power brake booster vacuum servo
```

FIGURE 19

Label
    Engine Intake Manifold Vent Pipe
"Engine" belongs to "Vehicle Systems" lexicon
    Engine is a meronym of "Vehicle Systems"
"Intake" belongs to "Vehicle Systems" lexicon
    Intake is a meronym of Engine
"Manifold" belongs to "Vehicle Systems" lexicon
    Manifold is a meronym of Engine Intake
"Vent" belongs to "Vehicle Systems" lexicon
    Vent is a meronym of Engine Intake Manifold
"pipe" belongs to "Universal Parts" lexicon
    Pipe is a hyponym of "Universal Parts"
    Pipe is Associated To Engine Intake Manifold Vent

FIGURE 21

ACID3::Brake
  SYN::Brake Hardware
  SYN::Brake System
  SYN:fr::Freins
  SYN:fr::Système De Freinage
  APID15398::Brake Conversion Kit
  ABS
    SYN::Anti Lock Brake
    SYN:ASID101::ABS Components
    SYN:fr::Composants ABS
    APID1580::ABS Accumulator
    ABS Actuator
    ABS Control
      SYN:fr::Contrôle ABS
      APID1844::ABS Control Module
        SYN:OPID1219:fr::Appareil de commande, système de freinage
      APID19420::ABS Control Module Insulator — Tecdoc standard Export (on Tecdoc request):

brake
  abs
    abs control
      abs control module

FIGURE 22

```
{
    "_id" : ObjectId("541dae8953154516601de161"),
    "has_ptf" : [
        "abs hydraulic control unit",
        "abs pressure regulator",
        "abs pump and motor"
    ],
    "ptf_of" : [
        "abs"
    ],
    "name" : "abs hydraulic",
    "language" : "en",
    "tags" : [
        "en"
    ],
    "atl_of" : [
        "assembly",
        "hoses",
        "repair kit",
        "valves"
    ],
    "level" : {
        "index" : 3,
        "name" : "specific",
        "rationale" : "generic downgraded to specific"
    },
    "label" : {
        "fr" : {
            "preferred" : "Agregat hydraulique, système de freinage"
        },
        "en" : {
            "preferred" : "ABS Hydraulic"
        }
    },
    "has_syn" : [
        "abs hydraulic block",
        "abs hydraulic unit",
        "bloc hydraulique abs",
        "agregat hydraulique, système de freinage"
    ]
}
```

FIGURE 23

An hyponym or meronym label must start with the label of the hyperonym or holonym it derives from.

Example:
    Engine Intake Manifold Vent Pipe, derives from:
        Engine Intake Manifold Vent, derives from:
            Engine Intake Manifold, derives from:
                Engine Intake, derives from:
                    Engine, derives from:
                        Vehicle Systems

FIGURE 25

Definitions:
　　Taxonomy and meronymy are defined by their nomenclature and their terminology. The structure nomenclature is the arrangement of its classes. Typically, the various levels of taxonomy and meronymy are referred to using the following terms:
　　　　　　unique beginner
　　　　　　life forms or supra-generic classes
　　　　　　generic classes
　　　　　　specific classes
　　　　　　varietal classes
　　The unique beginner is a top level category.
　　A Life-form is a high level category which has the unique beginner as a hyperonym but whose label does not derive from the unique beginner, and which is not directly producing derivative forms.
　　A generic category is a category which has the life-form as a hyperonym but whose label does not derive from the life-form, and which has "specific" hyponyms whose labels are derivated from the generic.
　　Specifics and varietals are further derivations of the generic.

Example:
　Unique Beginner: "Vehicle Systems"
　　Life form: "Brake"
　　　Generic: "ABS"
　　　　Specific: "ABS Control"
　　　　　Varietal: "ABS Control Module"

FIGURE 26A

Check levels: Check that nomenclature is consistent.
    if level in ['na','ub','varietal']:
        There is nothing to adjust
    Eliminate sequences of life-forms or generics
      If life-form follows life-form: Ignore the second life-form
      If generic follows generic, generic's hyperonym becomes life-form
    Adjust missing life-forms:
      If a life-form has derivative forms, downgrade to generic
    Adjust generic:
      Downgrade generic to specific if generic derives from its hyperonym
      Confirm generic if lexical derivation or no offspring
      A generic with no derivative forms is a life-form
    Adjust specific:
      Downgrade to varietal if hyperonym is already confirmed as specific
      Confirm specific if hyperonym already confirmed as generic
      Upgrade to generic if specific is not a lexical derivation from specific's hyperonym, and specific's hyponyms derive from specific

FIGURE 26B

3. Check Associations
Definitions: Associations, Source object, Destination object.
    A source object is the object initiating the "Associated To" link.

Vehicle Systems are always the ones that initiate an association.
    Example:
      Engine Intake Manifold Vent
          ATL::Hoses
     ("ATL": Associated-to link)

A destination object is the object receiving the association
    Example:
          Engine Intake Manifold Vent Pipe Destination objects are called "Universal Parts"

Vehicle Systems cannot be the destination of an association.

Universal Parts might pursue an association.
    Example:
      In Vehicle Systems:
          Engine Intake Manifold Vent
              ATL::Hoses
        In Universal Parts:
              Engine Intake Manifold Vent Pipe
                  ATL::Assembly
              Engine Intake Manifold Vent Pipe Assembly

FIGURE 27A

Since all Universal Parts are destination objects for some other object, it must be possible to subtract the Universal Part generic label, and find back the source object.

Example:
        Engine Intake Manifold Vent Pipe Assembly
            Minus "Assembly" which is a Universal Part
            Engine Intake Manifold Vent Pipe
            Minus "Pipe" which is a Universal Part
            Engine Intake Manifold Vent
            Which is a Vehicle System Check completeness: check that all universals are called by a Vehicle System or another Universal Part
    For all Universal Parts:
        If there is a source object matching the Universal Part as its associated destination object
        then: the association is 'RESOLVED'
        Example:
            Pipe is synonym of Hose
            "Engine Intake Manifold Vent Pipe" minus "Pipe" equals "Engine Intake Manifold Vent", which is the source object, to be found inside "Vehicle Systems", or "Universal Parts".

In the latter case, it must be possible to remove the intermediate association (another Universal generic) and lookup a source object in Vehicle Systems.

if there is no source object matching the associated destination object
        the association is 'UNRESOLVED'

FIGURE 27B

SYSTEM AND METHOD FOR BUILDING, VERIFYING AND MAINTAINING AN ONTOLOGY

PRIORITY CLAIMS/RELATED APPLICATIONS

This applications claims the benefit under 35 USC 119(e) to U.S. Provisional Application Ser. No. 62/098,152, filed Dec. 30, 2014 and entitled "System And Method For Building, Verifying And Maintaining An Ontology", the entirety of which is incorporated herein by reference.

APPENDICES

Appendix A (11 pages) is an example of an export json file for a brake example that may be part of an automotive part ontology;

Appendix B (12 pages) is an example of an ontology text file for a brake example that may be part of an automotive part ontology;

Appendix C (137 pages) is an example of an ontology json file for a brake example that may be part of an automotive part ontology; and Appendix D (16 pages) is an example of an execution trace file for a brake example that may be part of an automotive part ontology.

Each of these appendices form part of the specification and are incorporated herein by reference.

FIELD

The disclosure relates generally to a system and method for building, verifying and maintaining an ontology.

BACKGROUND

Many industries use a catalog to organize parts or services that may be available for purchase. Other industries may use a nomenclature/classification system to classify parts or services. Some industries may have several different classification systems that are used by different partisans in the industry. The use of different classification systems often results in confusion since the same part or service may be differently classified in each of the different classification schemes. For example, in the automotive industry, Europe and the United States have different classifications systems for automotive parts. In Europe, a TecDoc catalog/classification system for automotive parts is used (see www.techalliance.net for more details about the TecDoc catalog/classification system that is incorporated by reference herein.) In the United States, an Automotive Aftermarket Industry Association (AAIA) catalog/classification system is used (see www.aftermarket.org for more details about the AAIA catalog that is incorporated by reference herein.) Each of these different classification systems uses its own ontology which is a classification of the parts in the automotive domain. However, the ontologies used by each of the classification systems is different so that the same automotive part may be very differently classified in each of the different classification systems. This difference becomes a significant problem when a US automotive industry company is requesting a part (based on the AAIA catalog/classification) from a European manufacturer that is using the TecDoc catalog.

This same problem of different catalogs exists in many different industries. It is desirable to be able to merge the different classification systems (and ontologies) for an industry into a unified classification system that consistently classifies a particular part. For example, in the automotive industry, it is desirable to merge the TecDoc and AAIA catalogs. In order to merge the catalogs and/or create a unified classification system, an ontology for the unified classification system must be created, maintained as terms are created or new parts are created, etc. and verified to ensure that the ontology is correct.

BRIEF DESCRIPTION OF THE DRAWINGS

FIG. 5 illustrates a formal notation system that is derived as part of the method in FIG. 2;

FIGS. 6-7 illustrate an example of a mapping of an automotive meronymy and an automotive taxonomy into a built ontology;

FIGS. 11-12 are an example a structure generated from the built ontology for export;

FIG. 13 illustrates an example of an output data structure;

FIG. 14 illustrates an example of a repair process of maintaining the ontology;

FIG. 15 illustrates a tree pruning process that is part of process of maintaining the ontology;

FIGS. 16 and 17 are an example of identifying a cumulative transfer of nodes;

FIG. 18 illustrates a compress level process of building the ontology;

FIG. 19 illustrates an example of the compressed level ontology;

FIG. 21 illustrates how the associated links are generated by the system;

FIGS. 22 and 23 illustrate examples of the exporting process;

FIG. 25 illustrates more details of a method for checking lexical derivation that may be part of the method of FIG. 24;

FIGS. 26A and 26B illustrate more details of a method for checking structure that may be part of the method of FIG. 24; and FIGS. 27A-27B illustrate more details of a method for checking associations that may be part of the method of FIG. 24.

DETAILED DESCRIPTION OF ONE OR MORE EMBODIMENTS

The disclosure is particularly applicable to a client server computer architecture system for the automotive industry and it is in this context that the disclosure will be described. It will be appreciated, however, that the system and method has greater utility and is not limited to the client server computer system or the automotive industry described below in the example. For example, the system and method may be used for any industry or technology area or area in which it is desirable to be able to build, maintain and verify an ontology. Furthermore, the system and method may be implemented using other hardware, hardware and software or software architectures such as a cloud based architecture, a software as a service (SaaS) model, a standalone computer system or a computer readable medium that stores a plurality of lines of computer code that implement the functions and operations of the system and method.

Figure 1:
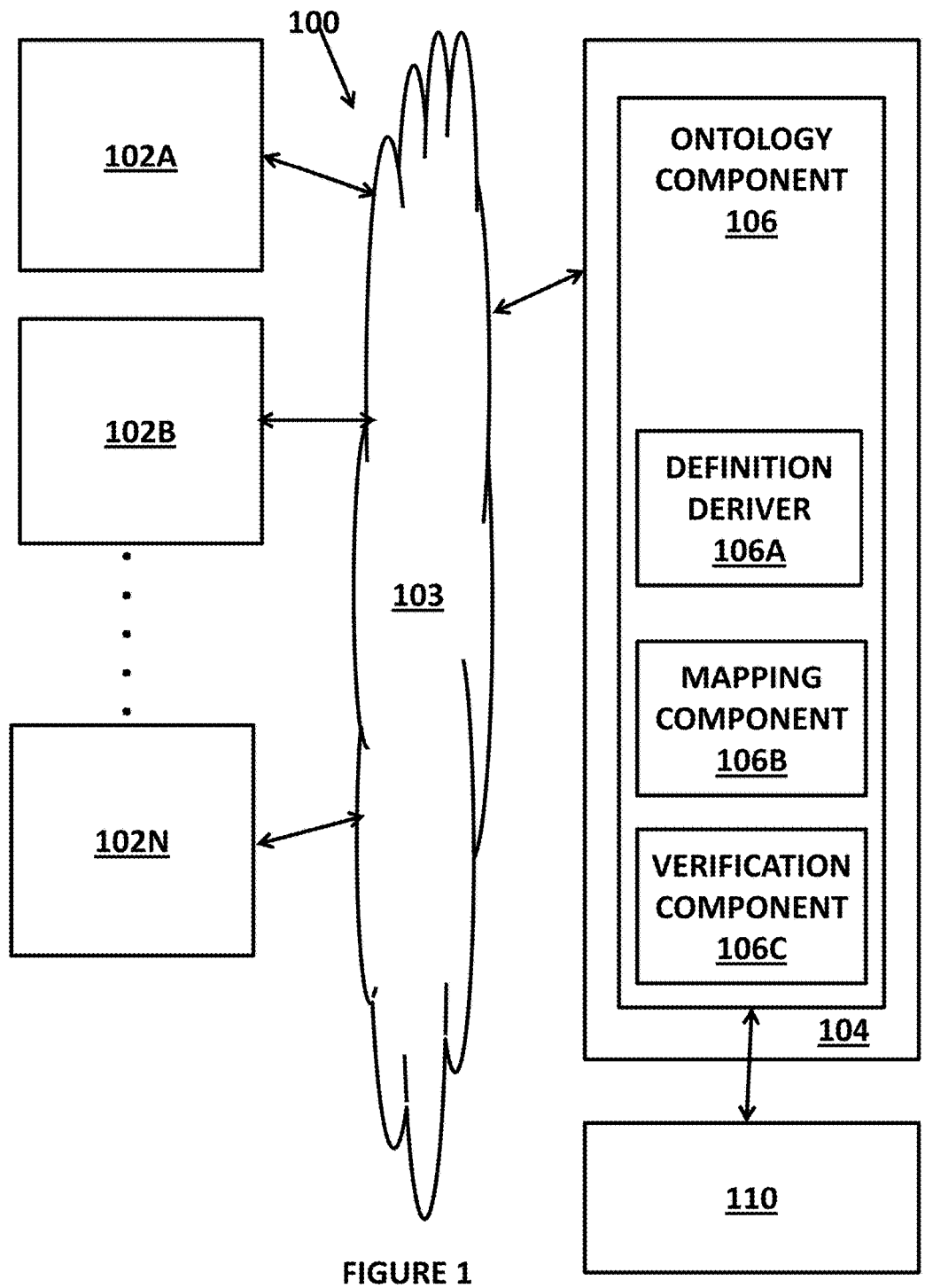
FIG. 1 illustrates an implementation of a system for building, maintaining and verifying an ontology.

FIG. 1 illustrates an implementation of a system 100 for building, maintaining and verifying an ontology. The system may have one or more computing devices or computing resources 102 (such as 102A, 102B, . . . , 102N) that may connect to and communicate over a communications path 103 to a backend system and component 104. For example, each computing device may have a processor and a memory, circuitry for connecting to and communicating with the backend over the communication path 103 and the like. For example, each computing device may be a smartphone device (such as an Apple® iPhone®, an Android® operating system based device, etc.), a tablet computer, a desktop computer, a terminal device and the like. For example, each computing resource may be a storage device or database or other system from which the system may receive data, such as through an application programming interface or other mechanism, that is used to build, maintain and verify an ontology as described below. For example, in the automotive industry example detailed below, the computing resources may include the TechDoc system and the AAIA system. In a client server implementation of the system, each computing device 102 may have an application, such as a browser application, an application or a mobile application, that may be stored in the memory of the computing device and executed by a processor of the computing device to facilitate the exchange of data with the backend system 104 in the form of webpages and the like.

In the system, each computing device or computing resource 102 may couple to and communicate with the backend 104 over the communication path 103 using a known connection and coupling protocol, such as HTTP or HTTPS when a client server system is implemented and various data protocols. The communication path 103 may be a wired computer network, such as Ethernet or the Internet, a wireless computer network, a wireless data communications network, such has WiFi, a wireless cellular data network and the like. The communication path 103 may also be a combination of one or more of the different types of networks described above that allow the computing device/computing resource 102 and the backend 104 to exchange data with each other.

The backend system/component 104 may be implemented using one or more computing resources. For example, the backend system/component 104 may be implemented using one or more server computer and server computing elements or using one or more cloud computing resources. When the backend system/component 104 of the system is implemented as a cloud based architecture, a software as a service (SaaS) model or a standalone computer system, the system and its components would be implemented using well known computer components such as at least a processor and a memory. When the backend component 104 is in a client server system as shown in FIG. 1, the backend component 104 may include a web server (implemented in software or hardware) that manages the connections and exchanges of data with each computing device/computing resource 102, such as by formulating and sending web pages to each computing device/computing resource 102 or gathering data from each computing resource 102.

The backend component 104 may have a connection to a store 110 that may store various data of the system and the backend component. The store 110 may be implemented in hardware or software. The store 110 may store, for example, the ontology that is built, maintained and verified by the system. For example, in the automotive industry example described below, the store 110 may store the automotive ontology generated by the system. The backend component 104 may further comprise one or more components 106-106C. Each of the components 106-106C may be implemented in software or in hardware. When each component is implemented in software, each component may be a plurality of lines of computer code stored in a memory and executed by a processor of the computing resource(s) in which the processor is configured to then implement the functions and operations of the components when the lines of code are executed. When each component is implemented in hardware, each component may be an ASIC, a programmable logic device, a microcontroller, an integrated circuit and the like.

When the system and its components are implemented on a computer readable medium or on a storage device, each component may be a plurality of lines of computer code. The plurality of lines of computer code may be executed while stored on the computer readable medium or on a storage device. The plurality of lines of computer code also may be downloaded from the computer readable medium or on a storage device to another computer system, stored in a memory of the computer system and executed by a processor of the computer system. The processor of the computer system may be then configured to implement the functions and operations of the components when the lines of code are executed.

The backend component 104 may have an ontology component 106 that builds, maintains and verifies an ontology of the backend system 104. The ontology may be then stored in the store 110. To build, maintain and verify the ontology, the ontology component may further comprise a definition deriver component 106A, a mapping component 106B and a verification component 106C. The definition deriver component 106A may create a formal definition of two or more systems as described below in more detail. In the automotive industry example described below, the two systems may be mechanical system and a universal parts system. The mapping component 106B may perform a mapping between the two systems as described below in more detail below to generate the ontology of the system. In the automotive industry example described below, the mapping may be performed between the mechanical system and a universal parts system to generate an automotive parts ontology. The verification component 106C may perform verification of the generated ontology as described below in more detail below. In the automotive industry example described below, the verification is performed on the automotive parts ontology.

Figure 2:
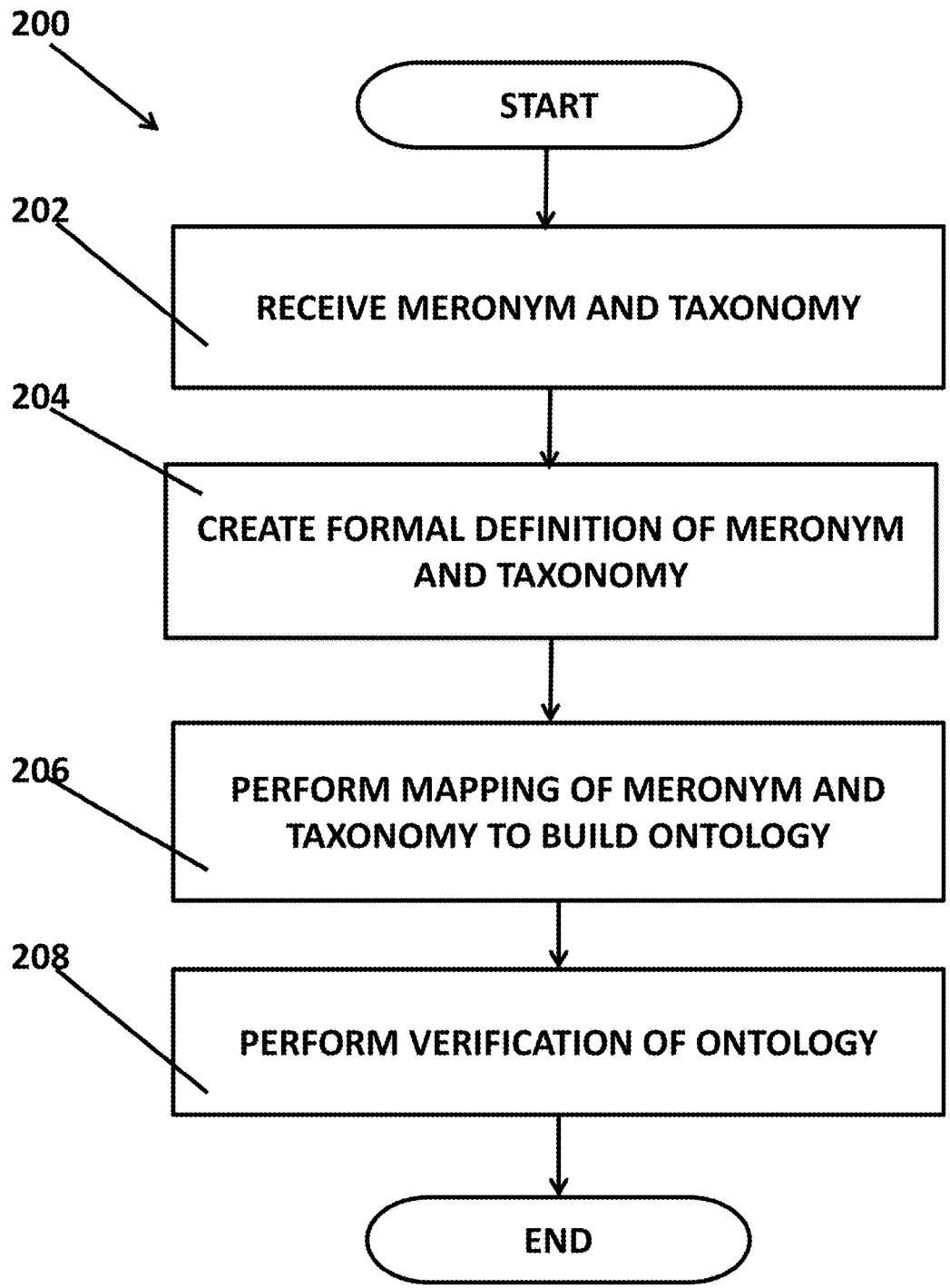
FIG. 2 illustrates a method for building, maintaining and verifying an ontology that may be performed using the system in FIG. 1.

FIG. 2 illustrates a method 200 for building, maintaining and verifying an ontology that may be performed using the system in FIG. 1. In one example described below, an automotive mechanical systems ontology may be built, maintained and verified using the method shown in FIG. 2. However, the method shown in FIG. 2 and the system in FIG. 1 may be used to build, maintain and verify an ontology for other industries, businesses or other purposes that are within the scope of this disclosure. For example, the system and method may be used to generate an ontology for aerospace mechanical systems, or railway mechanical systems.

In the method, a meronymy and a taxonomy (described below in more detail) from which the ontology is build is received (202.) For example, the system shown in FIG. 1 for example, such as the definition deriver component 106A, may perform this process. The ontology build by the system in FIG. 1 or using the method in FIG. 2 may include two basic types of hierarchical relationships: taxonomy and meronymy. In both cases, as in the classical model of the thesaurus, the founding relationship links a "Narrower Term" to a "Broader Term". The taxonomy binds the specific to the generic, while meronymy binds the part to the whole.

Figure 3:
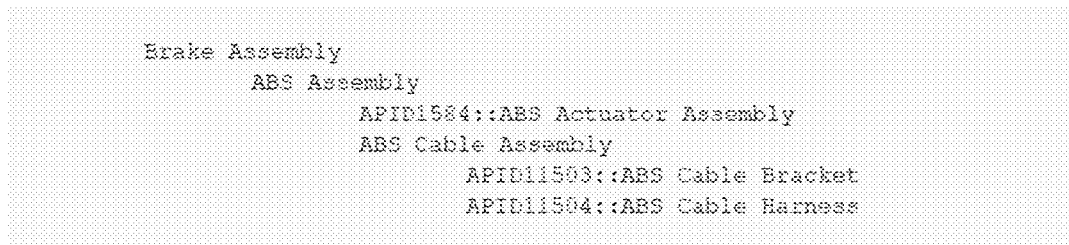
FIG. 3 illustrates an example of a taxonomy that may be used to build an ontology using the method shown in FIG. 2.

FIG. 3 illustrates an example of a taxonomy that may be used to build an ontology using the method shown in FIG. 2. In the example in FIG. 3, the ontology may be a universal parts taxonomy that may be used to build an automotive mechanical systems ontology. The taxonomy specifies the objects manipulated by the system as categories of more generic classes. This is typical for parts that can be understood as direct instances of a class, without additional complication (i.e. mechanisms): accessories (decor, lighting, and protection), intermediate parts (bearings, gaskets), assembly frames and tools. These parts can be related to various mechanisms and systems (hence the large number of association links across the 2 sides of the built ontology), but they are not themselves complex mechanisms. Species are defined by the context of use (fuel pump) or connecting piece (transmission bearing). In the example in FIG. 2, "ABS Cable Harness" is a kind of "ABS Cable Assembly", which is a kind of "ABS Assembly", itself a kind of "Brake Assembly". These relations are all taxonomical in nature, even if the "ABS Cable Assembly" is a second order relationship brought in "Assembly" through a dependency between ABS and "Cable", "ABS Cable" and "ABS Cable Assembly". For the automotive mechanical systems ontology, there may be numerous of these taxonomies with a taxonomy for each set of universal parts or parts assemblies for a vehicle.

Figure 4:
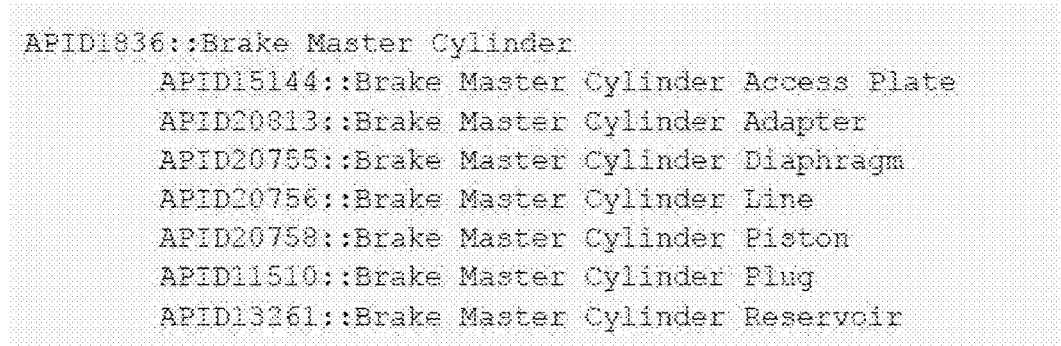
FIG. 4 illustrates an example of a meronymy that may be used to build an ontology using the method shown in FIG. 2.

FIG. 4 illustrates an example of a meronymy that may be used to build an ontology using the method shown in FIG. 2. In the example in FIG. 4, the ontology may be a vehicle systems meronymy that may be used to build an automotive mechanical systems ontology. In a mechanical context that is relevant to an automotive mechanical systems ontology, a meronymy describes functional systems at various levels of physical inclusion. These vehicle systems can be physical mechanisms contained in a confined enclosure, like a "gearbox" or a "carburetor". They can also be "systems" completed through the combination of different contributing mechanisms, like "cooling" or "ignition". For example, in FIG. 4, "Brake Master Cylinder" includes a "Brake Master Cylinder Access Plate", and various other components like a brake master cylinder plug. These relations are all meronymic in nature. For the automotive mechanical systems ontology, there may be numerous of these meronymies with a meronymy for each vehicle system.

Returning to FIG. 2, in the method, a formal definition for each of the meronymy and a taxonomy may be created (204). For example, the system shown in FIG. 1 for example, such as the definition deriver component 106A, may perform this process. In an example of an automotive parts ontology, a vehicle systems meronymy and a universal parts taxonomy may be used during the process. For example, FIG. 5 illustrates a formal notation system that may be derived as part of the method in FIG. 2. As shown in FIG. 5, a lexical derivation of the components that may be part of the built ontology may be performed. For example, for "Engine Intake Manifold Vent Pipe", that element may be broken down into each of its components starting with an engine as described in more detail below with reference to FIG. 20. Thus, each component that is going to be inserted from the taxonomy and meronymy have their definition derived using the formal notation system.

Figure 7:
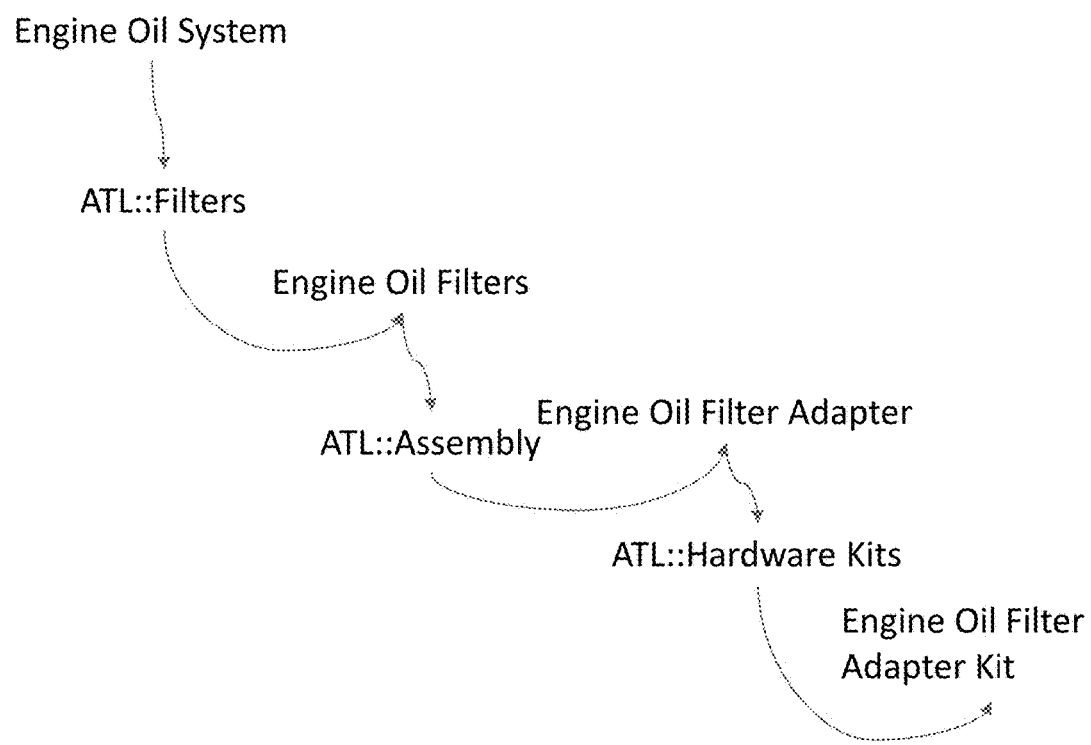
Figure 20:
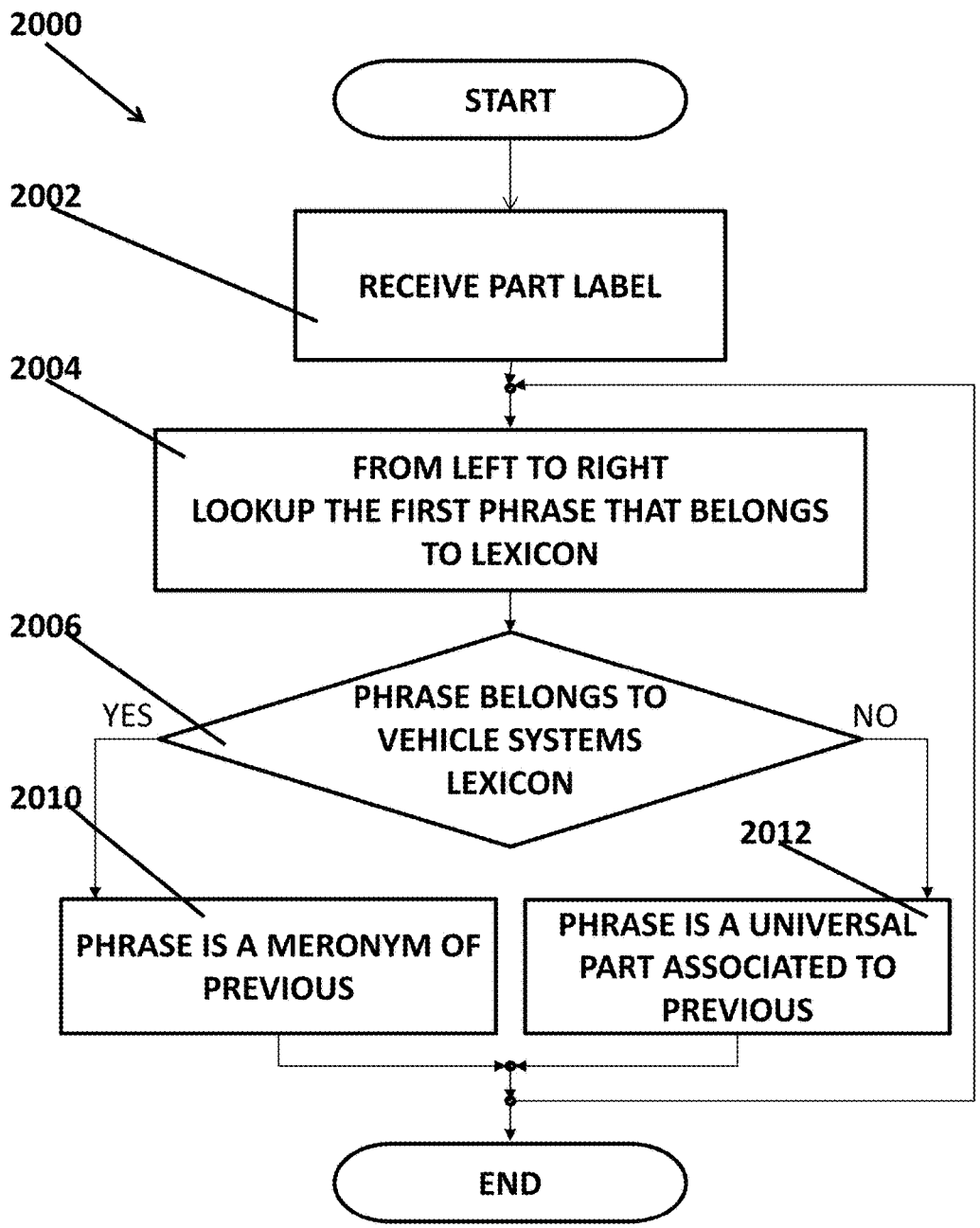
FIG. 20 illustrates an example of a method for breaking down the elements into components.

Returning to FIG. 2, the method may then perform a mapping of the meronymy and a taxonomy to build the ontology (206.) For example, the system shown in FIG. 1 for example, such as the mapping component 106B, may perform this process. In an example of an automotive parts ontology, a vehicle systems meronymy and a universal parts taxonomy may be used during the process to build an automotive mechanical systems ontology. The mapping of the meronymy and the taxonomy may use links (shown in ATL in the examples below) that allow the components of the meronymy and the taxonomy to be coupled to each other. FIGS. 6-7 illustrate an example of a mapping of an automotive meronymy and an automotive taxonomy into a built ontology. For example, FIG. 6 shows the mapped automotive meronymy and an automotive taxonomy is textual form while FIG. 7 graphically shows the same mapping using the links. Further details of the processes are shown in FIG. 20 and described below.

Returning to FIG. 2, the method may then perform a verification of the built ontology (208.) For example, the system shown in FIG. 1 for example, such as the verification component 106C, may perform this process. During the verification, lexical derivation may be verified. In addition, completeness of the ATL links is verified. Finally, cycles and duplications may be checked. Further details of the verification and checking process are described below with reference to FIGS. 24-27B.

Figure 8:
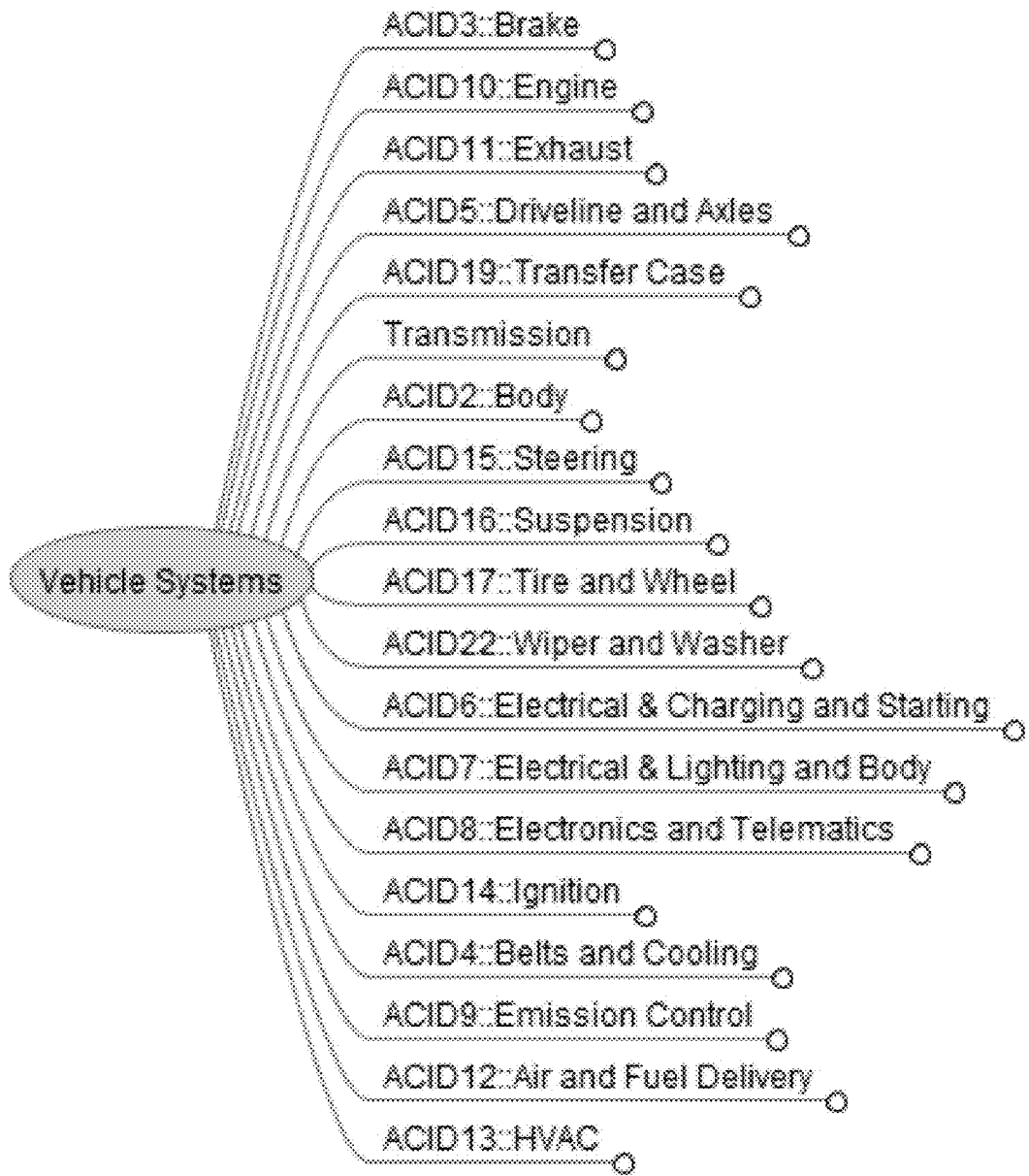
FIGS. 8-10 illustrate an example of a taxonomy that may be used to generate an automotive mechanical system ontology.
Figure 9:
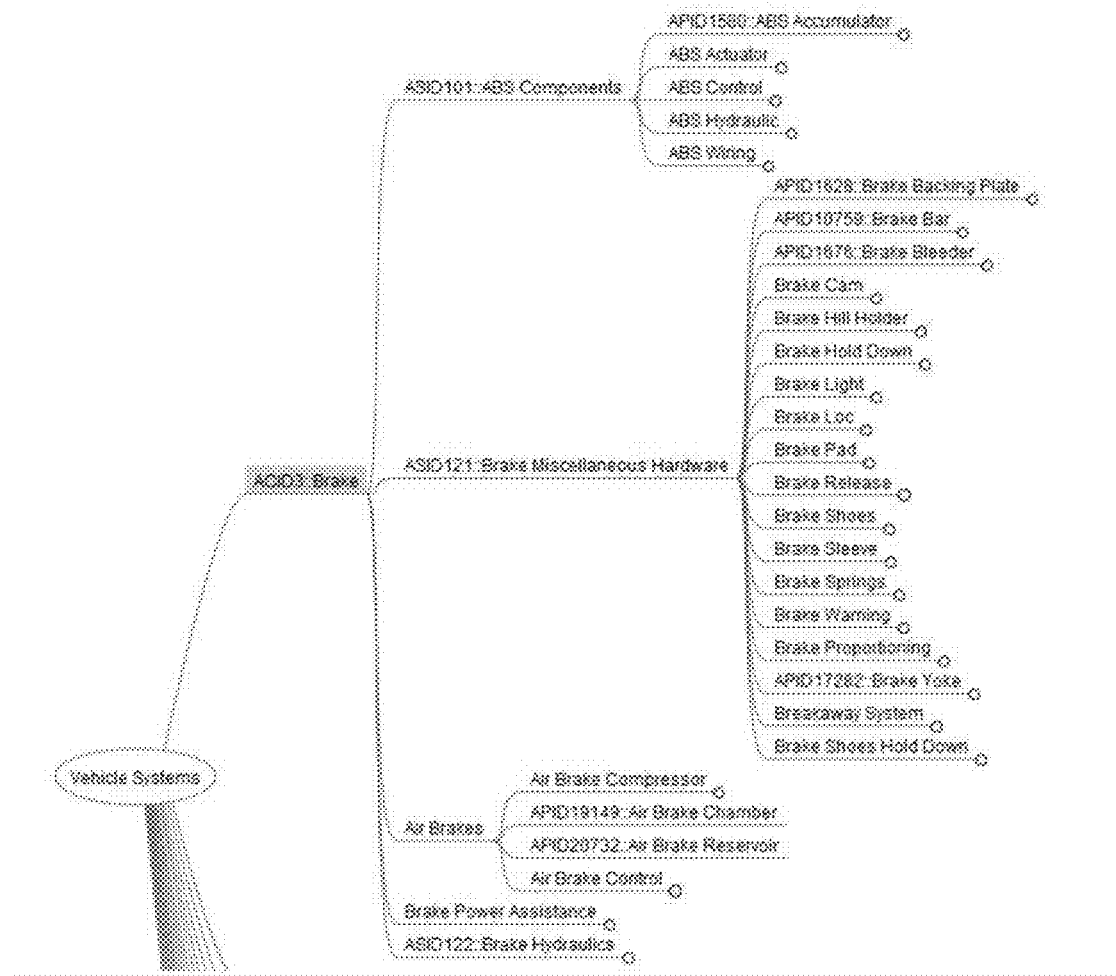

Now, an implementation of the system and method for building an automotive mechanical systems ontology using a vehicle system meronymy and a universal part taxonomy. An example taxonomy is shown in FIG. 8 in which "lifeforms" are the categories located at the top level of a taxonomy (and by extension, of a meronymy). They are not constrained by lexical derivation, and can only be validated by consensus. The choice for the ontology being built is to assume that the AAIA representation is consensual, and to keep the life-forms defined by the AAIA standard for all vehicle systems. In a well-formed taxonomy, "Generic" are the categories located immediately under the life-forms. They are constrained by lexical derivation, and are valid as long as this lexical derivation is strictly maintained throughout their offspring. For example, as shown in FIG. 9, "brake", standing really for "Braking System", is a lifeform, but it is also derived as a generic: "Air Brakes", "Brake Hydraulics". The hodge-podge category "Miscellaneous Hardware" regroups multiple specific forms also derived from the "Brake" life-form.

The category breakdown of "ABS Components" and "Air Brakes", because of this lexical derivation, has a taxonomic flavor, but is truly meronymic: An "Air Brakes" system includes a compressor, a chamber, a reservoir and a control, all parts prefixed by the generic whole "Air Brake". Lexical derivation, applied on taxonomy and meronymy, holds the pieces together and helps to maintain the hierarchy consistency.

Figure 10:
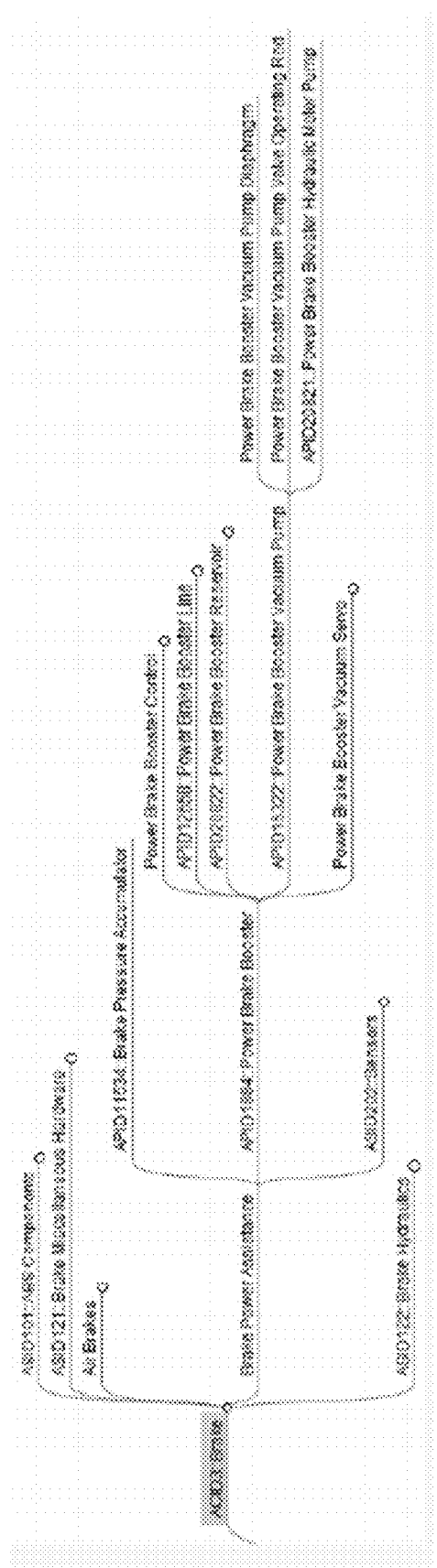

The depth of this derivation process reflects the complexity of the functional systems described. "Brake Power Assistance" is a kind of "Brake System". Since there is no real derivation, it's more like a life-form of brakes. From there, the lexical derivation works, from "Power Brake Booster" which is a generic ("Booster" being the strict generic, within the context of "Power Brakes"), towards "Power Brake Booster Vacuum Pump", and further on towards "Power Brake Booster Vacuum Pump Valve Operating Rod". These are derived forms, but again are meronymic in nature. It is easy to see that the lexical "glue" is more and more tenuous as we move from generic to specific to varietal. As shown in FIG. 10, although it is theoretically possible to breakdown these functional systems to an arbitrary number of levels, it is difficult to reach beyond the varietal level: generic+2.

The mapping for the automotive mechanical systems ontology is now described using the AAIA and Tecdoc classification systems.

The build ontology uses 2 types of headers:
AAIA originals, numbered and structured on 3 levels (although the de facto lexical derivation leads to a deeper implicit structure).
  13,168 original headers in the AAIA standard
  13,047 preserved (some duplicates removed)
Complementary nodes introduced for the sake of lexical consistency.
  934 headers in "Vehicle Systems"
  2,468 headers in Universal Parts
Total headers=16,449

Additionally, dependency links, noted "ATL" have been introduced to manage the relationships between systems and universals, then between universals:
  2,309 ATL in Vehicle Systems
  846 ATL in Universal Parts (second order associations)

The built ontology uses a derivative product of the Tecdoc standard that includes:
  1,161 headers (including all duplicates and close synonyms)
  All mapped to ontology categories
  Export The exporting process may involve simplifying the ontology format to 4 levels, 1 vanilla link to "Broader Term", named "parent" and flattened synsets. In one embodiment, the exports may be restricted to a set of requested standards, such as Tecdoc, AAIA, etc. In one embodiment, the export may have 3 language options: English, French, Dutch.

The export may start from a known JSON data structure compiled from the indented version of the ontology, and generates a simplified json as shown in FIGS. 11-12. An output JSON data structure of the export is shown in FIG. 13. Note that the Tecdoc tag (e.g. "OPID415") is attached to ""agregat hydraulique & système de freinage", and may be transferred to the synset header "abs hydraulic" when the synset will be flattened.

The export process may involve an export pipeline. The first part of the pipeline may be a level computation process. The level computation process may include a simple computation starting from level 1 at the root. In one embodiment, a set of standard names for levels may be:

levels=['na','ub','life_form','generic','specific','varietal']

Further details of these different levels are shown in FIGS. 26A and 26B are described below in more detail.

In the example in FIG. 19, "Brake" is the level 1 and "Brake"'s parent is "ub", the "Unique Beginner" of the ontology.

A second part of the export process may be performing level adjustment rules. The level adjustment rules may include confirming Life-forms since life form may be missing or the life-form is at a level which is not generic. The level adjustment rules may further include confirming generics that may include confirming generic if lexical derivation, confirming generic if no offspring and identifying a false generic which is not a specific is a life-form. The level adjustment rules may further include confirming specifics that may include identifying a varietal if hyper already confirmed as specific, identifying a specific if hyper already confirmed as generic and identifying an upgrade to generic if some hypo derives from the hyper. Further details of this process and the checking level process is shown in FIG. 26B.

The level adjustment rules may further include repairing sequences and the 2 sequences that can be repaired are life-forms and generics. In the example shown in FIG. 14, the "brake master cylinder" and "brake hydraulics" have both been computed as generics: They both show some level of lexical derivation, although the pattern is much more productive for "brake master cylinder". The right decision is to upgrade brake hydraulics to life-form.

The exporting process may further comprise tree pruning to eliminate unrequested branches, an example of which is shown in FIG. 15. In the tree pruning process, the system may traverse the tree depth-first and lookup tags that match the requested standard, e.g. "Tecdoc". Then, at each node, consider the header itself, and all the synonyms involved in the same synset. Then, at least one node bearing the requested standard is enough to qualify the node and the one node matching the requested standard qualifies the ancestors on the same path. In the example in FIG. 15, there may be several matching nodes on the same path, in breadth and depth. An example of the process is shown is in FIG. 22.

The export process may further comprise a reformatting of the nodes process. The reformatting process may include flattening broader terms (PTF, TAX), flattening synonym, transfer ID (standard) from all nodes in the synset as shown in FIGS. 16-17 and compress language information (eliminate the "preferred" level.) An example of this process is shown in FIG. 23 that shows the original representation of FIG. 16 before simplification of synonyms, PTF, TAX and preferred levels.

The export process may further comprise a compress level process. The compress process may move up levels at 5+, mostly varietal and sub-varietal terms. FIG. 18 illustrates a compress level process of building the ontology and FIG. 19 illustrates an example of the compressed level ontology.
  Results (on "Brake" test)
  Export json file (brakes_export.json)
  Ontology text file (brakes.oth)
  Ontology json file (brakes.json)
  Execution trace (brakes_trace.txt)
  Code committed, run convert_oths( ) in othlib.py to reproduce the trace and the files attached. The system may use mongo server. Examples of the above files are in Appendices A-D which form part of the specification and are incorporated by reference herein.

FIG. 20 illustrates an example of a method 2000 for breaking down the elements into components. The method may be performed by the mapping component 106B of the system of FIG. 1, but may also be performed by a processor that has been configured to perform the processes of the method that are now described. The method may be implemented in hardware or software as described above.

In the method, an element is received and a part label is received (2002). Examples of a part label are shown in FIG. 21. Once the part label is received, the method may, from left to right, look up the first phrase that belongs in the lexicon (2004) as shown in FIG. 21. The method may then determine if the phrase belongs to the lexicon (such as a vehicle systems lexicon for a system being used for an automotive parts ontology) (2006). If the phrase belongs to the lexicon, then the method determines that the phrase is a meronym of the previous phrase (2010). If the phrase does not belong to the lexicon, the method denotes the phrase as a universal part associated to the previous phrase (2012). Examples of both of these processes are shown in FIG. 21.

Figure 24:
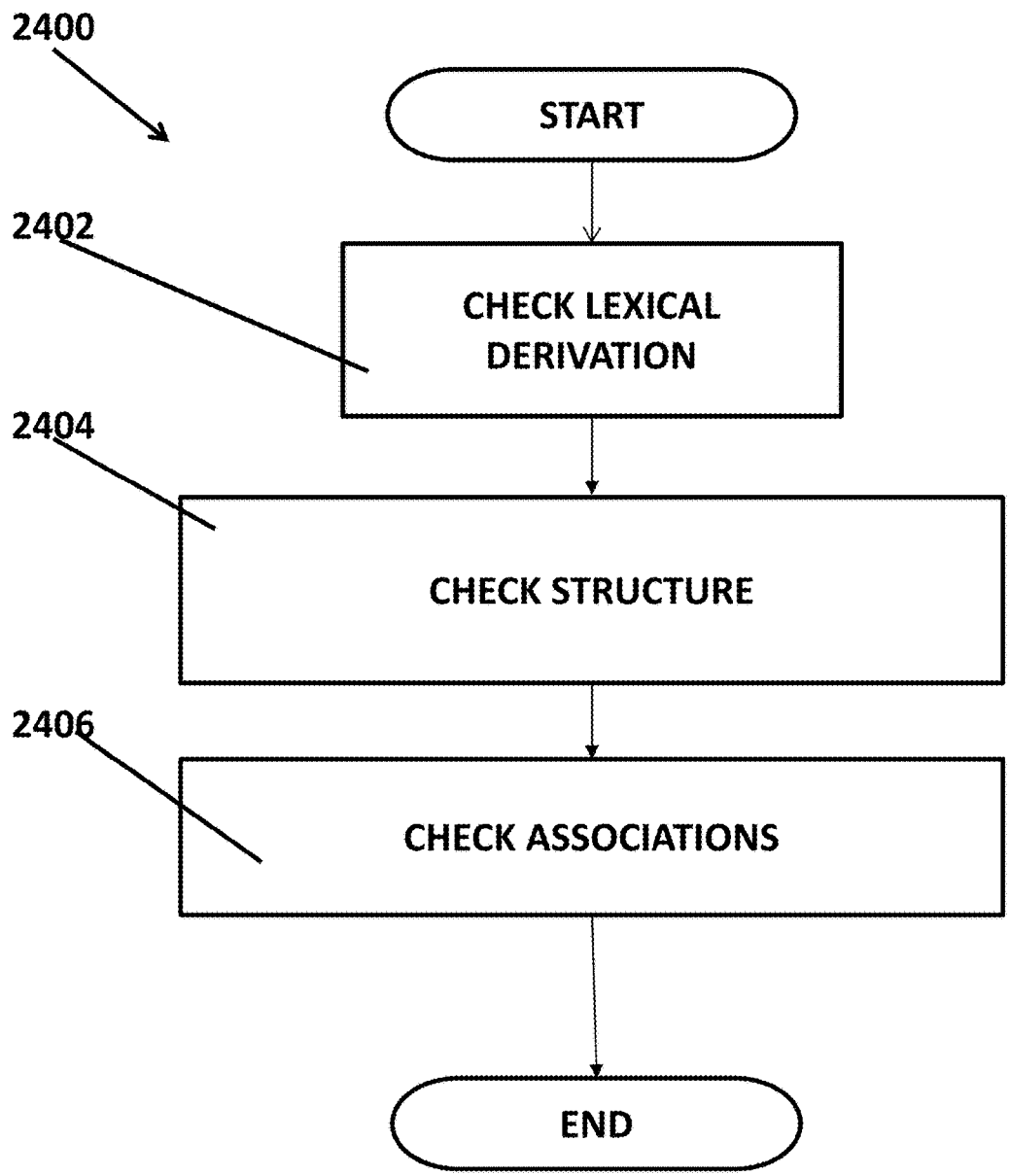
FIG. 24 illustrates more details of a method for verifying and checking the ontology.

FIG. 24 illustrates more details of a method 2400 for verifying and checking the ontology. The method may be performed by the verification component 106C of the system of FIG. 1, but may also be performed by a processor that has been configured to perform the processes of the method that are now described. The method may be implemented in hardware or software as described above.

In the method, the verification and checking may check the lexical derivation (2402) of the portion of the ontology. As shown in FIG. 25, an example of the checking of the lexical derivation is shown for the "Engine Intake Manifold Vent Pipe" portion of the ontology. The method may then check the structure of the ontology (2404) and check the associations of the ontology (2406) to perform the verification and checking process.

FIGS. 26A and 26B illustrate more details of a method for checking structure that may be part of the method of FIG. 24. FIG. 26B illustrates a checking levels process that may be part of the method for checking structures. FIGS. 27A-27B illustrate more details of a method for checking associations that may be part of the method of FIG. 24.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for generating an ontology, comprising:
a computer system having a processor and a memory;
the processor configured to receive a meronymy and a taxonomy and create formal definitions for each of the meronymy and the taxonomy;
the processor configured to map the meronymy and the taxonomy together using a plurality of association links and the formal definitions;
the processor configured to generate an ontology based on the mapping of the meronymy and the taxonomy and export the ontology;
the processor configured to compute a level for each element in the ontology and to adjust a level for an element of the ontology, wherein the level is one of a life form level, a generic level and a specific level, wherein the processor is configured to adjust the level for each element by confirming life form level elements, confirming generic level elements and confirming specific level elements.

2. The system of claim 1, wherein the processor is configured to verify the generated ontology.

3. The system of claim 2, wherein the ontology is an automotive parts ontology.

4. The system of claim 3, wherein the meronymy is a vehicle system meronymy.

5. The system of claim 4, wherein the taxonomy is a universal parts taxonomy.

6. The system of claim 1, wherein the processor is configured to perform lexical derivation of a plurality of elements in the taxonomy to map the taxonomy and the meronymy.

7. The system of claim 1, wherein the processor is configured to export the ontology.

8. The system of claim 7, wherein the processor is configured to compute a level for each element n the ontology and to adjust a level for an element of the ontology.

9. The system of claim 8, wherein the level is one of a life form level, a generic level and a specific level.

10. A system for generating an ontology, comprising:
a computer system laving a processor and a memory;
the processor configured to receive a meronymy and a taxonomy and create formal definitions for each of the meronymy and the taxonomy;
the processor configured to map the meronymy and the taxonomy together using a plurality of association links and the formal definitions;

the processor configured to generate an ontology based on the mapping of the meronymy and the taxonomy and export the ontology;

the processor configured to compute a level for each element in the ontology and to adjust a level for an element of the ontology, wherein the level is one of a life form level, a generic level and a specific level, wherein the processor is configured to adjust the level for each element by repairing sequences for the life form element and the generic element.

11. A method for generating an ontology, comprising:
receiving a meronymy and a taxonomy;
creating a formal definition for each of the meronymy and the taxonomy;
mapping the meronymy and the taxonomy together using a plurality of association links and the formal definitions;
generating an ontology based on the mapping of the meronymy and the taxonomy;
exporting the ontology; and
computing a level for each element in the ontology and adjusting a level for an element of the ontology, wherein the level is one of a life form level, a generic level and a specific level, wherein adjusting the level for each element further comprises confirming life form level elements, confirming generic level elements and confirming specific level elements.

12. The method of claim 11 further comprising verifying the generated ontology.

13. The method of claim 11, wherein the ontology is an automotive parts ontology.

14. The method of claim 13, wherein the meronymy is a vehicle system meronymy.

15. The method of claim 14 wherein the taxonomy is a universal parts taxonomy.

16. The method of claim 11, wherein mapping the meronymy and the taxonomy further comprises performing lexical derivation of a plurality of elements in the taxonomy.

17. The method of claim 11 further comprising exporting the ontology.

18. The method of claim 17 further comprising computing a level for each element in the ontology and adjusting a level for an element of the ontology.

19. The method of claim 18, wherein the level is one of a life form level, a generic level and a specific level.

20. A method for generating an ontology, comprising:
receiving a meronymy and a taxonomy;
creating a formal definition for each of the meronymy and the taxonomy;
mapping the meronymy and the taxonomy together using a plurality of association links and the formal definitions;
generating an ontology based on the mapping of the meronymy and the taxonomy;
exporting the ontology; and
computing a level for each element in the ontology and adjusting a level for an element of the ontology, wherein the level is one of a life form level, a generic level and a specific level, wherein adjusting the level for each element further comprises repairing sequences for the life form element and the generic element.

21. A system for generating an automotive parts ontology, comprising:
a computer system having a processor and a memory;
the processor configured to receive a vehicle system meronymy and a universal parts taxonomy and create formal definitions for each of the vehicle system meronymy and a universal parts taxonomy;
the processor configured to map the vehicle system meronymy and the universal parts taxonomy together using a plurality of association links and the formal definitions;
the processor configured to generate an automotive mechanical systems ontology based on the mapping of the vehicle system meronymy and the universal parts taxonomy together;
the processor is configured to export the ontology; and
the processor is configured to compute a level for each element in the ontology and to adjust a level for an element of the ontology, wherein the level is one of a life form level, a generic level and a specific level, wherein the processor is configured to adjust the level for each element by confirming life form level elements, confirming generic level elements and confirming specific level elements.

22. The system of claim 21, wherein the processor is configured to verify the automotive mechanical systems ontology.

23. The system of claim 21, wherein the processor configured to map the vehicle system meronymy and the universal parts taxonomy together performs lexical derivation of a plurality of elements in the taxonomy.

24. The system of claim 21, wherein the processor is configured to export the ontology.

25. The system of claim 24, wherein the processor is configured to compute a level for each element in the ontology and to adjust a level for an element of the ontology.

26. The system of claim 25, wherein the level is one of a life form level, a generic level and a specific level.

27. A system for generating an automotive parts ontology, comprising:
a computer system having a processor and a memory;
the processor configured to receive a vehicle system meronymy and a universal parts taxonomy and create formal definitions for each of the vehicle system meronymy and a universal parts taxonomy;
the processor configured to map the vehicle system meronymy and the universal parts taxonomy together using a plurality of association links and the formal definitions;
the processor configured to generate an automotive mechanical systems ontology based on the mapping of the vehicle system meronymy and the universal parts taxonomy together;
the processor is configured to export the ontology; and
the processor is configured to compute a level for each element in the ontology and to adjust a level for an element of the ontology, wherein the level is one of a life form level, a generic level and a specific level, wherein the processor is configured to adjust the level for each element by repairing sequences for the life form element and the generic element.

* * * * *